(12) United States Patent
Mussmann et al.

(10) Patent No.: US 8,695,329 B2
(45) Date of Patent: Apr. 15, 2014

(54) DENOX OF DIESEL ENGINE EXHAUST GASES USING A TEMPERATURE-CONTROLLED PRECATALYST FOR PROVIDING $NO_2$ IN ACCORDANCE WITH THE REQUIREMENTS

(75) Inventors: Lothar Mussmann, Offenbach (DE); Ingo Lappas, Glashuetten (DE); Andreas Geisselmann, Offenbach (DE); Wilfried Mueller, Karben (DE)

(73) Assignee: UMICORE AG & Co. KG, Hanau-Wolfgang (DE)

( * ) Notice: Subject to any disclaimer, the term of this patent is extended or adjusted under 35 U.S.C. 154(b) by 434 days.

(21) Appl. No.: 12/808,088

(22) PCT Filed: Dec. 12, 2008

(86) PCT No.: PCT/EP2008/010570
§ 371 (c)(1),
(2), (4) Date: Sep. 7, 2010

(87) PCT Pub. No.: WO2009/077126
PCT Pub. Date: Jun. 25, 2009

(65) Prior Publication Data
US 2011/0000189 A1    Jan. 6, 2011

(30) Foreign Application Priority Data
Dec. 15, 2007  (DE) .......................... 10 2007 060 623

(51) Int. Cl.
*F01N 3/20*          (2006.01)
(52) U.S. Cl.
USPC ................. 60/295; 60/274; 60/276; 60/286; 60/287; 60/297; 60/300; 60/301; 60/303; 60/311

(58) Field of Classification Search
USPC ........... 60/274, 276, 282, 284, 286, 287, 289, 60/295, 297, 299, 300, 301, 303, 311
See application file for complete search history.

(56) References Cited

U.S. PATENT DOCUMENTS

| | | | | |
|---|---|---|---|---|
| 5,609,021 A | * | 3/1997 | Ma ................................. | 60/274 |
| 5,689,952 A | * | 11/1997 | Kato et al. ..................... | 60/277 |
| 5,987,885 A | | 11/1999 | Kizer et al. | |
| 6,182,443 B1 | * | 2/2001 | Jarvis et al. ..................... | 60/274 |
| 6,805,849 B1 | | 10/2004 | Andreasson et al. | |
| 6,843,971 B2 | | 1/2005 | Schsfer-Sindlinger et al. | |
| 6,938,409 B2 | * | 9/2005 | Birckigt et al. ................. | 60/275 |
| 2002/0039550 A1 | * | 4/2002 | Schafer-Sindlinger et al. ......................... | 423/239.2 |
| 2002/0042342 A1 | * | 4/2002 | Mussmann et al. ........... | 502/304 |
| 2004/0040284 A1 | | 3/2004 | Upadhyay et al. | |
| 2006/0179825 A1 | * | 8/2006 | Hu et al. ........................ | 60/297 |
| 2007/0044456 A1 | | 3/2007 | Upadhyay et al. | |
| 2007/0089403 A1 | * | 4/2007 | Pfeifer et al. ................... | 60/286 |
| 2007/0175208 A1 | * | 8/2007 | Bandl-Konrad et al. ....... | 60/286 |
| 2008/0202101 A1 | * | 8/2008 | Driscoll et al. ................ | 60/286 |
| 2008/0223019 A1 | * | 9/2008 | Gonze et al. ................... | 60/286 |
| 2009/0158719 A1 | * | 6/2009 | Hallstrom et al. ............. | 60/297 |
| 2009/0169451 A1 | | 7/2009 | Andreasson et al. | |

FOREIGN PATENT DOCUMENTS

| | | |
|---|---|---|
| DE | 10 2005 013 707 | 9/2006 |
| DE | 10 2006 051 790 | 5/2008 |
| DE | 10 2007 006 625 | 8/2008 |
| EP | 1 027 919 | 8/2000 |
| EP | 1 147 801 | 10/2001 |
| EP | 1 054 722 | 12/2001 |
| JP | 2002-266625 | 9/2002 |
| JP | 2005-256727 | 9/2005 |
| WO | 99/39809 | 8/1999 |
| WO | 2004/076829 | 9/2004 |

OTHER PUBLICATIONS

PCT International Preliminary Report on Patentability (Form PCT/IB/373) for PCT/EP2008/010570 dated Jun. 15, 2010 (in English language).

Devadas et al., "Influence of $NO_2$ on the selective catalytic reduction of NO with ammonia over Fe-ZSM5", Applied Catalysis B: Environmental, Elsevier, vol. 67, No. 3-4, 2006, pp. 187-196.

Database Compendex, Engineering Information, Inc., New York, NY, US, Madia et al., "The effect of an oxidation precatalyst on the NOx reduction by ammonia SCR", XP-002521589 (1 page abstract referencing ACS-US, vol. 41, No. 15, Jul. 24, 2002, pp. 3512-3517).
International Search Report for PCT/EP2008/010570 mailed Apr. 7, 2009.

* cited by examiner

*Primary Examiner* — Thomas Denion
*Assistant Examiner* — Jorge Leon, Jr.
(74) *Attorney, Agent, or Firm* — Smith, Gambrell & Russell, LLP

(57) ABSTRACT

The adherence to future legally obligatory exhaust gas limit values for diesel vehicles in Europe, North America and Japan requires not only the removal of particles but also effective removal of nitrogen oxides from the exhaust gas ('deNOx'). The 'active SCR process' is the preferred method for this. The nitrogen oxide conversions achieved by means of this process are particularly high when an optimal $NO_2/NO_x$ ratio, preferably 0.5, is set upstream of the SCR catalyst. The invention proposes a process which solves the problem of supplying $NO_2$ in accordance with requirements by means of temperature control of the precatalyst which is decoupled from the operating state of the engine. In an associated apparatus, a precatalyst (1) which contains at least one oxidation component and whose temperature can be controlled independently of the operating state of the engine and an active SCR stage comprising an SCR catalyst (3c) with upstream metering facility (3b) for a reducing agent from an external source (3a) are arranged in series. A particle filter (2) can be arranged between precatalyst and metering facility. The precatalyst preferably additionally contains a nitrogen oxide storage material.

22 Claims, 2 Drawing Sheets

Figure 1:
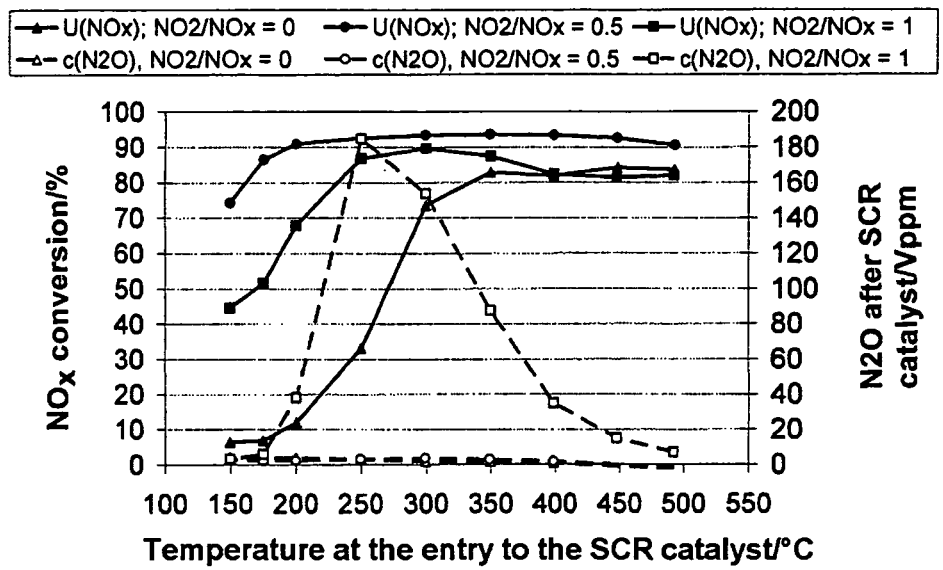

DENOX OF DIESEL ENGINE EXHAUST GASES USING A TEMPERATURE-CONTROLLED PRECATALYST FOR PROVIDING NO₂ IN ACCORDANCE WITH THE REQUIREMENTS

The present invention relates to a process for purifying diesel engine exhaust gases, especially for removing nitrogen oxides, and an apparatus for carrying out the process of the invention.

The emissions present in the exhaust gas of a motor vehicle can be divided into two groups. Thus, the term primary emission refers to pollutant gases which are formed directly in the engine by the combustion process of the fuel and are present in the raw exhaust gas at the cylinder outlet. Secondary emissions are pollutant gases which can be formed as by-products in the exhaust gas purification unit. The raw exhaust gas from diesel engines comprises the usual primary emissions carbon monoxide CO, hydrocarbons HC and nitrogen oxide $NO_x$ together with a relatively high oxygen content of up to 15% by weight. In addition, particle emissions which comprise predominantly soot residues and possibly organic agglomerates and originate from partially incomplete combustion of the fuel in the cylinder can also be present.

The adherence to future legally obligatory exhaust gas limit values for diesel vehicles in Europe, North America and Japan requires not only the removal of particles but also effective removal of nitrogen oxides from the exhaust gas ("deNOx"). The pollutant gases carbon monoxide and hydrocarbons can easily be made nonpolluting in the lean exhaust gas by oxidation over a suitable oxidation catalyst. Suitable apparatuses for removing the particle emissions are diesel particle filters with and without an additional catalytically active coating. The reduction of the nitrogen oxides to nitrogen is more difficult because of the high oxygen content. Known processes are either based on the use of nitrogen oxide storage catalysts (NOx storage catalyst NSC) or are processes for selective catalytic reduction (SCR), usually by means of ammonia as reducing agent, over a suitable catalyst, known as an SCR catalyst for short. Combinations of these processes in which, for example, ammonia is generated as secondary emission over an upstream nitrogen oxide storage catalyst under rich operating conditions and this ammonia is firstly stored in a downstream SCR catalyst and in a subsequent lean operating phase is utilized for the reduction of nitrogen oxides passing the nitrogen oxide storage catalyst are also known.

Use of such "passive" processes for removal of $NO_x$ from diesel engine exhaust gases is limited by, in particular, the fact that provision of rich operating phases cannot be achieved at will in diesel engines. Thus, both the regeneration of nitrogen oxide storage catalysts (desorption with simultaneous reduction of the desorbed nitrogen oxides to nitrogen) and the generation in accordance with requirements of an internal reducing agent ($NH_3$, possibly also HC or CO), which requires an SCR catalyst for conversion of $NO_x$, can only be achieved with the aid of auxiliary measures, for example injection of further fuel into the exhaust gas train or into the cylinder during the exhaust stroke of the piston. Such auxiliary measures lead to an undesirable increasing fuel consumption and also make it more difficult to adhere to the legal limits for CO and HC.

Accordingly, the "active" SCR process is at present the preferred process for the removal of $NO_x$ from diesel engine exhaust gases. Here, the amount of nitrogen oxides present in the exhaust gas is decreased with the aid of a reducing agent introduced into the exhaust gas train from an external source. Preference is given to using ammonia or a compound which can be decomposed into ammonia, e.g. urea or ammonium carbamate, as reducing agent. The ammonia, which may have been generated in situ from the precursor compound, reacts with the nitrogen oxides from the exhaust gas in a comproportionation reaction to form nitrogen over the SCR catalyst.

A combination of different exhaust gas purification apparatuses is at present unavoidable in order to meet the impending legal requirements. An apparatus for purifying diesel engine exhaust gases has to contain at least one oxidation-active catalyst and, for deNOx, an SCR catalyst having an upstream metering facility for reducing agent (preferably ammonia or urea solution) and an external reducing agent source (for example an additional tank containing urea solution). If it is not possible to keep particle emissions sufficiently low for them to be able to be removed by direct oxidation by means of oxygen over the oxidation catalyst by optimization of the combustion process in the engine, additional use of a particle filter is necessary.

Corresponding exhaust gas purification systems have already been described; some are at present being tested practically.

Thus, EP-B-1 054 722 describes a system for the treatment of diesel exhaust gases containing $NO_x$ and particles, in which an oxidation catalyst is installed upstream of a particle filter. A reducing agent source and a metering facility for the reducing agent and also an SCR catalyst are arranged on the outflow side of the particle filter. In the process described here, the proportion of $NO_2$ in the exhaust gas and thus the $NO_2/NO_x$ ratio is increased by at least partial oxidation of NO over the oxidation catalyst, with the $NO/NO_2$ ratio preferably being "set to a predetermined level which is optimal for the SCR catalyst" (cf. claim 12 of the patent document). The specific $NO/NO_2$ ratio to be set is not indicated. This is instead regarded as an individual value determined by the type of SCR catalyst used (cf. [0009]).

EP-A-1 147 801 describes a process for decreasing the amount of nitrogen oxides present in the lean exhaust gas of an internal combustion engine by selective catalytic reduction by means of ammonia, likewise with part of the NO present in the exhaust gas firstly being oxidized to $NO_2$ over an oxidation catalyst before the exhaust gas is then passed together with ammonia over an SCR catalyst. In this case, the SCR catalyst contains zeolites which have been exchanged with transition metals. The oxidation catalyst located upstream of this reduction catalyst is selected and dimensioned so that the exhaust gas contains a nitrogen oxide mixture having an $NO_2/NO_x$ ratio of from 0.3 to 0.7 before contact with the SCR catalyst.

US 2007/0044456 discloses a system for purifying diesel exhaust gases, in which the removal of the nitrogen oxides is carried out over an SCR catalyst by means of urea solution introduced before the catalyst or ammonia generated therefrom. An oxidation catalyst is located upstream of the metering facility for urea and the reduction catalyst; a particle filter is located on the outflow side of the SCR catalyst. An improved $NO_x$ conversion performance of this system is achieved by determination of the amount of ammonia stored in the SCR catalyst and corresponding optimization of the amount of ammonia metered in upstream of the catalyst.

Apart from exhaust gas purification systems which contain an oxidation catalyst and an SCR catalyst with a metering facility for an external reducing agent and if appropriate a particle filter, the prior art also describes systems in which the oxidation catalyst is replaced by a nitrogen oxide storage catalyst. This is possible since conventional nitrogen oxide storage catalysts are not only able to oxidize nitrogen oxides to $NO_2$ and then store this as nitrates but frequently also display good oxidation properties in respect of the exhaust gas components CO and HC.

For example, EP-A-1 027 919 discloses an exhaust gas purification system for diesel exhaust gases, which contains a precatalyst and an active SCR stage comprising the SCR catalyst and the upstream metering device for a reducing agent from an external source. The precatalyst effects oxidation of appropriate constituents of the diesel exhaust gas. In addition, it contains a nitrogen oxide storage material. At low temperatures, nitrogen oxides from the raw emission are firstly stored in the precatalyst. After the exhaust gas temperature increases, the nitrogen oxides are thermally desorbed from the precatalyst and converted into nitrogen, possibly also into $N_2O$, over the downstream reduction catalyst.

WO 2004/076829 likewise describes an exhaust gas purification system made up of a precatalyst and an active SCR stage comprising the SCR catalyst and the upstream metering facility for a reducing agent from an external source. The precatalyst likewise contains an oxidation-active component and a nitrogen oxide storage material, with the materials selected differing in terms of their composition from the system described in EP-A-1 027 919. In a particular embodiment, the coating is applied to a particle filter substrate. The system operates in a manner analogous to the unit described in EP-A-1 027 919. In addition, the $NO_2/NO_x$ ratio, which according to the data in this document is from 0.05 to 0.35 in the raw emission, is increased in a targeted manner over the precatalyst in order to improve the conversion over the downstream SCR catalyst. It is found that the optimum $NO_2/NO_x$ ratio for the SCR catalyst is 0.5.

In all these exhaust gas purification systems according to the prior art for diesel engine exhaust gases, the exhaust gas purification apparatuses are coupled both thermally and chemically, i.e. based on the composition of the exhaust gas, with one another and with the respective operating state of the engine. The operating state of the engine determines both the composition of the raw exhaust gas and thus the amount of oxidizing and reducing agents available in the exhaust gas and also substantially determines the temperature of the downstream catalysts. The efficiency of the exhaust gas purification apparatuses themselves thus depends critically on the continually changing operating point of the engine.

This leads to the conventional exhaust gas purification systems described being unsuitable for use in applications in which low-load operating points and thus low exhaust gas temperatures (on average less than 250° C.) predominate. In such applications, the average exhaust gas temperatures required for a satisfactory purification effect of the system are not provided by the engine. This applies, for example, in high-load diesel vehicles which are used predominantly in inner cities, e.g. city buses or city cleaning vehicles, or to standard diesel vehicles which are intended for use in the Asian region.

It is an object of the present invention to achieve a significant increase in the efficiency of a combined exhaust gas purification system for diesel vehicles containing at least a precatalyst and an active SCR stage comprising an SCR catalyst with upstream metering facility for a reducing agent from an external source by at least partial decoupling of the exhaust gas purification components. In particular, the improvement in the conversion performance of the exhaust gas purification unit in terms of the decrease in amounts of nitrogen oxide in the diesel exhaust gas should occur at low exhaust gas temperatures. This object is achieved by a process for decreasing the amount of the nitrogen oxides present in the lean exhaust gas of an internal combustion engine by selective catalytic reduction by means of ammonia according to the features of claim 1 and by an apparatus as claimed in claim 7, which are comprehensively described below.

The invention is based on the following observations:

It is known that the SCR catalyst displays the best nitrogen oxide conversion performance when an appropriate supply of reducing agent is available. Ideally, the ratio of $NO_x/NH_3$ is in the range from 0.9 to 1.1. This presents no difficulties when ammonia is metered in an amount regulated according to requirements in the active SCR process.

Furthermore, optimal nitrogen oxide conversions are achieved only when equimolar amounts of nitrogen monoxide and nitrogen dioxide are present ($NO/NO_2=1$) or the ratio of $NO_2/NO_x=0.5$. FIG. 1 shows, by way of example, the dependence of the nitrogen oxide conversion and the selectivity of the conversion on the $NO_2/NO_x$ ratio at $NO_x/NH_3=0.9$ for a conventional SCR catalyst based on an iron-exchanged zeolite. It can clearly be seen that nitrogen oxide conversions of about 90% are achieved over the entire temperature range from 200 to 500° C. only at an $NO_2/NO_x$ ratio of 0.5. The greatest influence of the $NO_2/NO_x$ ratio is observed in the low-temperature range up to 250° C. If no $NO_2$ is present in the exhaust gas introduced, as is usually the case for the raw exhaust gas, virtually no conversion is observed below 200° C. On the other hand, if the $NO_x$ consists entirely of $NO_2$, approximately theoretical conversions are achieved at 250° C. but analysis of the exhaust gas downstream of the catalyst shows that the reduction of significant amounts of $NO_2$ leads not to nonpolluted nitrogen but to nitrous oxide $N_2O$. Optimal conversions beginning at 75% conversion at as low as 150° C. with at the same time optimal selectivity to nitrogen are achieved according to the stoichiometry of the reaction equation

$$2\ NH_3 + NO + NO_2 \rightarrow 2\ N_2 + 3\ H_2O$$

only at an $NO_2/NO_x$ ratio of 0.5. This applies not only to SCR catalysts based on iron-exchanged zeolites but to all conventional, i.e. commercially available, active SCR catalysts.

In the processes of the prior art, the $NO/NO_2$ or $NO_2/NO_x$ ratio upstream of the reduction catalyst is determined firstly by the operating point of the engine, the exhaust gas temperature and composition of the raw exhaust gas and secondly influenced by the type, number and activity of the exhaust gas purification apparatuses located upstream of the inflow end of the active SCR stage.

Figure 2:
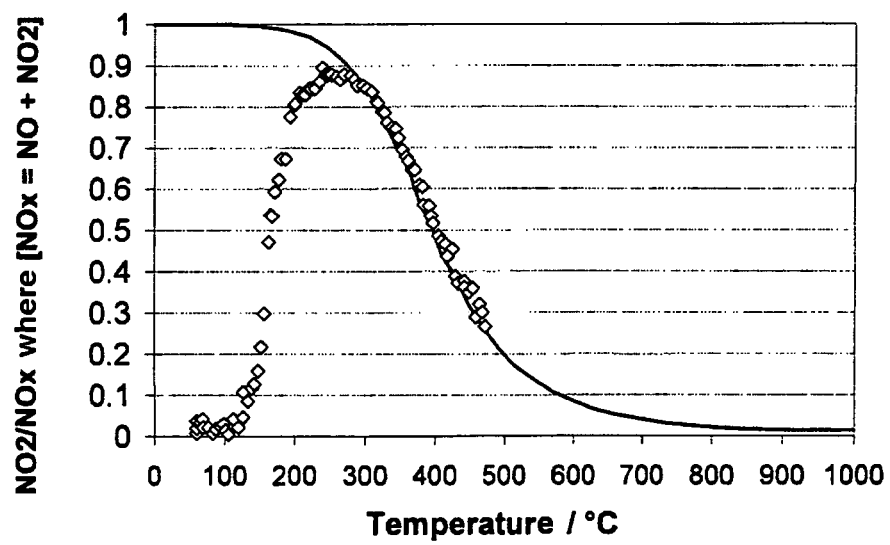

$NO_2$ is usually generated by passing the raw emission containing both NO and oxygen over a precatalyst which contains at least one oxidation-active component. The conversion is determined by the type of catalyst itself, its state of aging, the exhaust gas temperature and the oxygen partial pressure in the raw emission. The latter two parameters determine the position of the equilibrium of the oxidation reaction and thus the maximum $NO_2/NO_x$ ratio which can be achieved. Composition and state of aging of the precatalyst determine the minimum exhaust gas temperature at which the activation energy required for the oxidation reaction is exceeded with the aid of the catalyst and the catalyst "lights (off)"; the light-off temperature of the catalyst. FIG. 2 shows by way of example the relationship between exhaust gas temperature and the $NO_2/NO_x$ ratio obtained in a model gas over a conventional, platinum-containing oxidation catalyst at an oxygen content of 6% by volume. The solid line shows the position of the equilibrium of the oxidation reaction as a function of the temperature. At low temperatures up to just below 200° C., the equilibrium lies completely on the side of $NO_2$ formation. Above 700° C., $NO_2$ is no longer stable and only NO is then present. An $NO_2/NO_x$ ratio of 0.5 is passed through at about 400° C. The curve made up of the measuring points shows the actual $NO_2/NO_x$ ratios established in a component-reduced model gas over a freshly produced, conventional, platinum-containing oxidation catalyst. The catalyst "lights off" only at about 140° C. The $NO_2$ formation then increases steeply with increasing temperature until the equilibrium line is attained at about 280° C. An $NO_2/NO_x$ ratio of 0.5 is reached at about 160° C. and is virtually immediately exceeded. Thermal aging of the catalyst and the presence of other oxidizable exhaust gas components lead to an increase in the NO light-off temperature with a simultaneous decrease in the oxidation activity. With increasing aging, attainment of the equilibrium curve occurs at ever higher exhaust gas temperatures. When the catalyst has aged to a great extent, conversions of 50% in the NO oxidation and thus $NO_2/NO_x$ ratios of 0.5 are sometimes no longer observed.

FIG. 2 clearly shows how difficult it is to ensure an optimal $NO_2/NO_x$ ratio when it is set purely "passively" over an oxidation catalyst which is not regulated further. Further difficulties are obtained when the exhaust gas purification system additionally contains, as in EP-B-1 054 722, further exhaust gas purification apparatuses, for example a particle filter, between oxidation catalyst and active SCR stage. In this case, $NO_2$ is consumed during passage of the exhaust gas through the particle filter when the filter is at least partially laden with soot. The strong oxidizing agent $NO_2$ then reacts with soot to form CO or $CO_2$ and NO, so that the $NO_2/NO_x$ ratio is reduced. This process is also known to those skilled in the art as the "CRT effect" (CRT®=Continuous Regenerating Trap). The extent to which the $NO_2/NO_x$ ratio is reduced depends on the state of loading of the particle filter, the $NO_2$ content of the exhaust gas and the exhaust gas temperature. In such a system arrangement, supply of $NO_2$ in accordance with requirements to the active SCR stage can no longer be ensured for all operating points of the engine and over the entire period of operation of the motor vehicle.

The present invention solves the problem of introduction of $NO_2$ in accordance with requirements by temperature control of the precatalyst, which determines the $NO_2/NO_x$ ratio, being decoupled from the operating state of the engine. According to the process of the invention, the amount of nitrogen oxides present in the lean exhaust gas from an internal combustion engine is decreased by selective catalytic reduction by means of ammonia, with the exhaust gas firstly being passed over a precatalyst which is located upstream of the reduction catalyst and contains an oxidation-active catalytic component. Part of the nitrogen monoxide present in the exhaust gas is oxidized to nitrogen dioxide over the precatalyst, so that the exhaust gas has an $NO_2/NO_x$ ratio of from 0.3 to 0.7 before it is passed together with ammonia over the reduction catalyst. The process is characterized in that the temperature of the precatalyst is set independently of the operating state of the engine using a temperature-control device so that the desired $NO_2/NO_x$ ratio is achieved.

The basis for the temperature regulation of the precatalyst is an activity measurement characteristic of the catalyst used in the freshly produced state and in the thermally aged state, as is shown by way of example in FIG. 2. These data are recorded in the engine control system. On this basis, the required temperature which the precatalyst has to have in order to produce the necessary $NO_2/NO_x$ ratio is laid down. The actual temperature of the exhaust gas, which is needed as a second determining parameter for the actual quantity of heat to be introduced, can be determined by means of a temperature sensor positioned on the inflow side of the precatalyst. However, it can also be taken from a table of characteristics recorded in the engine control system as a function of the respective engine operating point. A sensor can additionally be arranged upstream of the reduction catalyst in order to measure the $NO_2/NO_x$ ratio prevailing there. The result of this measurement can be used as an additional regulating parameter for setting the temperature of the precatalyst.

The setting of the temperature of the precatalyst, which comprises a support body and a catalytically active coating, is preferably effected by heating and cooling of the support body. For this purpose, the support body present in the precatalyst and the temperature-control device have to form one unit. This ensures solid/solid heat transfer from the support body directly into the catalytically active coating, leading, owing to the close contact of the media participating in heat transfer and the higher heat capacities of the material, to more rapid heating/cooling of the catalyst, especially in heating-up phases, than heat transfer into the exhaust gas.

In terms of apparatus, the temperature control of the precatalyst is preferably achieved by use of an electrically heated, metallic honeycomb body as the support body for the catalytically active coating.

As an alterative, the catalytically active coating can be applied to a heat-exchange apparatus. As heat transfer medium, preference is given to using ambient air which is drawn in by means of a secondary air pump present in the motor vehicle and heated by means of a burner which is positioned outside the exhaust gas unit and is operated by means of fuel and can be switched on as required. An advantage of such an arrangement in terms of apparatus is that when the burner is switched off it can also be used for active countercooling of the precatalyst when, for example, the latter heats up strongly as a result of the exothermic, catalytic reaction of residual hydrocarbons from incomplete combustion in the engine. The catalyst can in this way be protected against rapid thermal aging.

In particular, heating of the precatalyst support body ensures rapid heating during the cold start phase of the vehicle, so that the amount of $NO_2$ upstream of the reduction catalyst which is required for optimal $NO_x$ conversion is provided even in this phase. In addition, it can be ensured even during the cold start phase that temperatures sufficient to achieve CO and HC light off are attained over the precatalyst. All significant gaseous emissions can therefore be effectively decreased even during the cold start phase of the motor vehicle when the process of the invention is employed.

Since the heating of the precatalyst by means of the temperature-control device can be used not only during the cold start phase of the engine but in all operating points in which the exhaust gas temperatures provided by the engine are not sufficient for optimal operation of the precatalyst, the process of the invention is, unlike the systems from the prior art, also suitable for "cold" applications such as city buses, city cleaning vehicles, etc.

To improve the low temperature conversion further, the precatalyst also preferably contains a nitrogen oxide storage material. This can temporarily store nitrogen oxides from the raw emission, in particular at exhaust gas temperatures below 200° C., so that $NO_x$ breakthroughs through the exhaust gas unit, for example during the cold start phase of the vehicle, can be prevented completely. Nitrogen oxide storage materials which display good storage properties for nitrogen oxides even at temperatures in the range from 80 to 220° C. are particularly well suited. Preference is given here to rare earth oxides as nitrogen oxide storage materials. Particular preference is given to using nitrogen oxide storage materials containing cerium oxide or cerium-rich cerium-zirconium mixed oxides.

A nitrogen oxide storage material integrated into the catalytic coating of the heated precatalyst can also be utilized effectively for actively supporting the introduction of $NO_2$ in accordance with requirements. This applies particularly when the exhaust gas purification unit contains a diesel particle filter between the precatalyst and the active SCR stage comprising an SCR catalyst with upstream metering facility for a reducing agent from an external source. In this case, the $NO_2/NO_x$ ratio upstream of the reduction catalyst is additionally determined by the state of loading of the particle filter and by the oxidation activity of any catalytically active coating present on the filter.

The combination of nitrogen oxide storage material and temperature-control device in the precatalyst enables the process to be operated so that the $NO_2/NO_x$ ratio is set optimally in accordance with the requirements of the downstream reduction catalyst even beyond the filter depending on exhaust gas temperature and the loading of the filter with soot. Thus, the "CRT effect", i.e. reaction of $NO_2$ with soot to form CO or $CO_2$ and NO, which results in a decrease in the $NO_2/NO_x$ ratio, over the filter occurs only at temperatures above 250° C. and an appropriate soot loading. At operating points in which the conditions for a "CRT effect" are met, it is necessary to select an $NO_2/NO_x$ ratio which is preferably greater than 0.7 upstream of the filter. If this cannot be achieved by the oxidation power of the precatalyst alone, the ratio can be adjusted by targeted thermal desorption of $NO_2$ which has previously been stored in the nitrogen oxide storage material. Should the exhaust gas temperature achieved by the engine not be sufficiently high for thermal desorption of $NO_2$, this process can be controlled in a targeted manner by means of the temperature-control device integrated into the support body of the precatalyst.

The process of the invention displays the indicated advantages especially when the exhaust gas purification unit contains a diesel particle filter in addition to the precatalyst and the active SCR stage comprising an SCR catalyst with upstream metering facility for a reducing aging from an external source. The diesel particle filter is then preferably arranged between the precatalyst and the metering facility. As an alternative, the diesel particle filter can also be arranged on the outflow side of the reduction catalyst or be used as support body for an SCR-active catalytic coating and be arranged instead of the reduction catalyst on the outflow side of the metering facility.

Figure 3:
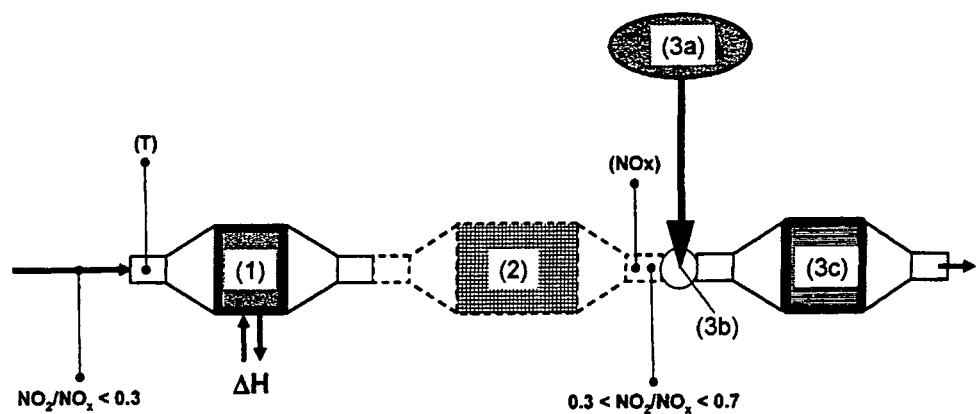

The invention is illustrated below by means of FIGS. 1 to 3 and an example. The figures show:

FIG. 1: Dependence of the nitrogen oxide conversion and the selectivity of the nitrogen oxide reduction over a conventional reduction catalyst based on an iron-exchange zeolite on the $NO_2/NO_x$ ratio at $\alpha=NO_x/NH_3=0.9$ and a space velocity of 30,000 1/h;
catalysts were examined in the freshly produced state in a defined model gas composition; the curves marked with solid symbols and solid lines show the $NO_x$ conversion, while the curves denoted by the corresponding open symbols and broken lines show the respective $N_2O$ concentrations in the exhaust gas downstream of the catalyst;
where:
(•)/(○) denote measured values for $NO_2/NO_x=0.5$;
(▲)/(△) denote measured values for $NO_2/NO_x=0 \rightarrow NO_x=NO$ and
(■)/(□) denote measured values for $NO_2/NO_x=1 \rightarrow NO_x=NO_2$ FIG. 2: Relationship between exhaust gas temperature and the $NO_2/NO_x$ ratio set over a conventional, platinum-containing oxidation catalyst, measured in a component-reduced model gas having an oxygen content of 6% by volume;
solid line=calculated equilibrium position of the reaction $NO+\frac{1}{2}O_2 \rightarrow NO_2$
(◇)=measured $NO_2/NO_x$ ratio where $NO_x=NO+NO_2$ over a conventional Pt-based oxidation catalyst;

FIG. 3: Exhaust gas purification system for carrying out a preferred embodiment of the process of the invention; here:
(1) denotes the temperature-controllable precatalyst
(2) denotes a particle filter (optional)
(3) denotes the active SCR stage comprising:
(3*a*) an external reducing agent source, e.g. tank for urea solution
(3*b*) a metering facility, e.g. injection nozzle
(3*c*) a reduction catalyst (SCR catalyst)

Figure 4:
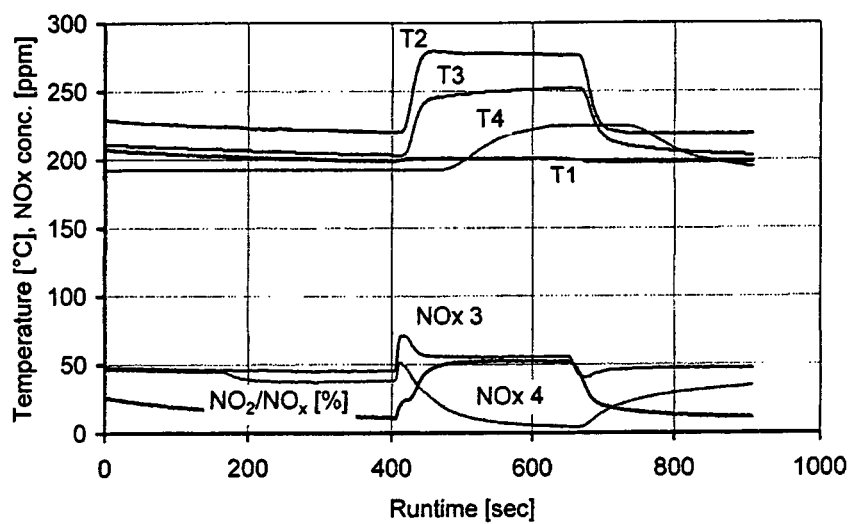

FIG. 4: Illustrates one example of a runtime relationship to multiple temperature levels, multiple $NO_x$ concentrations, and a molar $NO_2/NO_x$ ratio incurred in an exhaust gas purification system of the present invention.

Illustrative Embodiment

FIG. 3 shows the preferred configuration of an exhaust gas unit for carrying out the exhaust gas purification process of the invention for diesel engines.

The raw emission produced by the diesel engine is firstly passed over a precatalyst (1) which contains an oxidation-active catalytic component and preferably a nitrogen oxide storage material. Preference is given to using a catalyst which contains from 0.07 to 5.5 g/l of platinum, based on the total catalyst volume, supported on a cerium-rich cerium-zirconium mixed oxide (>50% by weight of $CeO_2$). As a support body, it is possible to use a metallic honeycomb having an integrated heating coil (electrically heated catalyst EHC; from Emitec) and from 16 to 62 cells per square centimeter. At the entry to the precatalyst, there is a temperature sensor (T) which measures the exhaust gas temperature before the precatalyst (actual temperature) and transmits this information to the engine control system for calculating the required temperature. After passing through the precatalyst, which is, with the aid of the additional heating in the EHC, maintained at a required temperature which leads to establishment of the desired $NO_2/NO_x$ ratio, the exhaust gas is passed on via a particle filter (2) to an active SCR stage (3). An uncoated wall flow filter is used as particle filter. At the outlet of the particle filter, the $NO_2/NO_x$ ratio is measured by means of a suitable sensor ($NO_x$) and, if necessary, the heating power at the precatalyst is altered on the basis of this measured value until the measured $NO_2/NO_x$ ratio is in the desired range of $0.3<NO_2/NO_x<0.7$. The reducing agent which is required for carrying out the SCR reaction and comes from a tank (3*a*) arranged outside the exhaust gas unit is metered via the metering facility (3*b*) into the exhaust gas train in accordance with requirements. The amount of reducing agent, typically urea solution, required is likewise determined with the aid of the $NO_x$ value determined upstream of the metering position. The optimal mixture of reducing agent and exhaust gas produced in this way is then passed over the SCR catalyst (3*c*) which ensures optimal removal of NO from the exhaust gas.

Working Example

The following system was measured on an engine test bed (3.0 l diesel engine with common rail injection system, turbocharging and EGR, 6 cylinders, nominal power: 180 kW):
Position close to the engine: Pt/Pd catalyst, 140 g/ft$^3$, coated on a metallic, heatable honeycomb body (power consumption: 2 kW)=DOC
underbody position: iron-zeolite catalyst—SCR
urea introduction, installed upstream of the SCR catalyst the heated catalyst can be switched on and off in order to obtain an NO2/NOx ratio of about 0.5 upstream of the SCR catalyst.

In the test, the engine was run at a constant operating point (1700 min$^{-1}$, 28 Nm, mass flow of exhaust gas about 93 kg/h) which results in an entry temperature T1 in the DOC of 200° C. From a running time of 165 sec onwards, a constant 4.2 mg/sec of an aqueous urea solution (32.5% by weight) is injected. The $NO_x$ concentration upstream of the SCR catalyst, NOx 3, of 45 ppm is reduced by addition of a reducing agent to a value downstream of the SCR catalyst, NOx 4, of 38 ppm, which corresponds to a conversion of 15.5%. After about 400 sec, the heated catalyst is switched in. The $NO_2/NO_x$ ratio immediately increases until it reaches a value of about 0.5. At the same time, the $NO_x$ conversion over the SCR catalyst increases to about 90%. In this way, an increase in conversion which goes significantly beyond the superimposed effect of the temperature increase in the SCR catalyst and clearly shows the positive effect of setting an optimal DOC operating temperature is achieved. After switching off the input of heat energy at a running time of 655 sec, the $NO_2$ formation and thus also the $NO_x$ conversion over the SCR catalyst decrease again with the gradual cooling of the DOC.

Comment: The increase in the NOx level NOx 3 after switching on the heating energy is explained by a reduced HC-deNOx conversion over the DOC.

Notes for the FIG. 4:
T1: Entry temperature into the heatable DOC
T2: Exit temperature from the heatable DOC
T3: Entry temperature into the SCR catalyst
T4: Exit temperature from the SCR catalyst
NOx 3: NOx entry concentration into the SCR catalyst in ppm
NOx 4: NOx exit concentration from the SCR catalyst in ppm
$NO_2/NO_x$: molar $NO_2/NO_x$ ratio in % on entry into the SCR catalyst Optimal exhaust gas purification results can be achieved over virtually all significant operating states of the engine by means of such an exhaust gas purification unit. This applies particularly at operating points at which the exhaust gas temperatures generated by the engine are on average below 250° C. or at which poor $NO_x$ conversions are achieved in a conventional system, for example as described in EP-B-1 054 722, because of at least partial loading of the intermediate particle filter with soot since an optimal $NO_2/NO_x$ ratio upstream of the reduction catalyst is not achieved as a result of the "CRT effect".

The invention claimed is:

1. A process for decreasing the amount of nitrogen oxides present in the lean exhaust gas from an internal combustion engine by selective catalytic reduction by means of ammonia, comprising:
    oxidizing a portion of nitrogen monoxide present in an exhaust gas to nitrogen dioxide over a precatalyst, the precatalyst containing at least one oxidation-active catalytic component, the gas has a target $NO_2/NO_x$ ratio of from 0.3 to 0.7 prior to passing, together with ammonia, over the reduction catalyst; and
    regualting a temperature of the precatalyst independently of an operating state of the engine, by temperature-control device that selectively heats and cools the precatalyst, so that the target $NO_2/NO_x$ ratio is achieved, wherein
    regulating the temperature of the precatalyst by the temperature-control device includes selectively heating and cooling the precatalyst such that the exhaust gas has a first $NO_2/NO_x$ ratio prior to entering the particle filter, the first $NO_2/NO_x$ ratio being a ratio that compensates for a reaction between the exhaust gas and soot loading of the particle filter such that the exhaust gas has the target $NO_2/NO_x$ ratio upon interacting with an SCR-active catalytic coating of the reduction catalyst.

2. The process as claimed in claim 1, wherein
the temperature of the precatalyst is regulated, to achieve the target $NO_2/NO_x$ ratio, on the basis of:
    data of an activity measurement characteristic of the precatalyst in a freshly produced state and an activity measurement characteristic of the precatalyst in a thermally aged state recorded in an engine control system; and
    an actual temperature of the exhaust gas, as determined by means of a temperature sensor positioned on an inflow side of the precatalyst, or as taken from a table of characteristics recorded in the engine control system as a function of a respective engine operating point.

3. The process as claimed in claim 2, wherein
an $NO_2/NO_x$ ratio upstream of the reduction catalyst is determined by means of a sensor, and
the determined $NO_2/NO_x$ ratio value is used as an additional regulating parameter for regulating the temperature of the precatalyst.

4. The process as claimed in claim 1, wherein
the precatalyst comprises a support body and a catalytically active coating, and
the temperature of the precatalyst is regulated by selectively heating and cooling the support body.

5. The process as claimed in claim 4, wherein
the catalytically active coating of the precatalyst contains a nitrogen oxide storage material in which nitrogen oxides from a raw emission are temporarily stored at exhaust gas temperatures below 200° C.

6. The process as claimed in claim 4, wherein
the catalytically active coating of the precatalyst contains a nitrogen oxide storage material which is capable of releasing previously stored $NO_2$, by targeted thermal desorption, at temperatures above 250° C.; and
the nitrogen oxide storage material is utilized to achieve the target $NO_2/NO_x$ ratio.

7. The process as claimed in claim 1, wherein
the temperature control device that is used to regulate the temperature of the precatalyst, to achieve the target $NO_2/NO_x$ ratio, includes a secondary air pump that is used for at least cooling the precatalyst.

8. The process as claimed in claim 1, wherein
the temperature of the precatalyst is regulated, to achieve the target $NO_2/NO_x$ ratio, by:
    determining, with an engine control system, a $NO_2/NO_x$ ratio of the exhaust gas that interacts with the SCR-active catalytic coating; and
    controlling the temperature-control device to adjust an upstream $NO_2/NO_x$ ratio of the exhaust gas, by selectively heating and cooling the precatalyst, to achieve the first $NO_2/NO_x$ to compensate for a reaction between the exhaust gas and a soot loading of the particle filter.

9. An apparatus for decreasing an amount of nitrogen oxides present in a lean exhaust gas from an internal combustion engine by selective catalytic reduction by means of ammonia, which comprises:

a reduction catalyst;
a precatalyst which is located upstream of the reduction catalyst, the precatalyst having at least one oxidation-active catalytic component;
a particle filter located downstream of the precatalyst which is configured either: as a separate component arranged upstream from the reduction catalyst; or as a support body of the reduction catalyst carrying an SCR-active catalytic coating;
a metering facility for ammonia or a compound which is capable of decomposing into ammonia, the metering facility being connected to a reducing agent source independent of an exhaust gas stream, the metering facility being arranged between the precatalyst and the reduction catalyst; and
a temperature-control device configured to selectively heat and cool the precatalyst independently of an operating state of the engine such that the exhaust gas has a first $NO_2/NO_x$ ratio prior to entering the particle filter, the first $NO_2/NO_x$ ratio being a ratio that compensates for a reaction between the exhaust gas and a soot loading of the particle filter such that the exhaust gas has a target $NO_2/NO_x$ ratio of from 0.3 to 0.7 upon interacting with an SCR-active catalytic coating of the reduction catalyst.

10. The apparatus as claimed in claim 9, wherein a temperature sensor is arranged on an inflow side of the precatalyst.

11. The apparatus as claimed in claim 10, wherein a sensor for measuring an $NO_2/NO_x$ ratio prevailing upstream of the reduction catalyst is arranged upstream of the reduction catalyst.

12. The apparatus as claimed in claim 9, wherein the precatalyst comprises a support body and a catalytically active coating and the temperature-control device forms a unit with the support body present in the precatalyst.

13. The apparatus as claimed in claim 12, wherein an electrically heatable, metallic honeycomb body is used as the support body.

14. The apparatus as claimed in claim 12, wherein the catalytically active coating is applied to a heat-exchange apparatus used as the support body.

15. The apparatus as claimed in claim 12, wherein the apparatus comprises an exhaust gas unit that includes the precatalyst, the metering facility and the reduction catalyst; and
the apparatus further comprises a secondary air pump and a burner, which are configured to draw in and heat ambient air for use as a heat transfer medium, wherein
the burner is positioned outside the exhaust gas unit and is configured to operate by means of fuel and a switch.

16. The apparatus as claimed in claim 12, wherein the catalytically active coating of the precatalyst additionally contains a nitrogen oxide storage material.

17. The apparatus as claimed in claim 12, wherein the particle filter is a diesel particle filter arranged between the precatalyst and the metering facility for ammonia or a compound which is capable of decomposing into ammonia, and
the temperature-control device is configured to selectively heat and cool the precatalyst such that the exhaust gas has the first $NO_2/NO_x$ ratio that compensates for a reaction between the exhaust gas and a soot loading of the particle filter prior to entering the particle filter such that the exhaust gas has the target $NO_2/NO_x$ ratio after passing through the particle filter and prior to entering the reduction catalyst.

18. The apparatus as claimed in claim 12, wherein the particle filter is a diesel particle filter that is configured as a support body for the reduction catalyst having an SCR-active catalytic coating, and which is arranged on an outflow side of the metering facility.

19. The apparatus as claimed in claim 9, further comprising an engine control system that stores recorded data of an activity measurement characteristic of the precatalyst in a freshly produced state, and an activity measurement characteristic of the precatalyst in a thermally aged state, wherein
the temperature control device is configured to regulate the temperature of the precatalyst, to achieve the target $NO_2/NO_x$ ratio, through use of the recorded data of the activity measurement characteristics for the freshly produced state and the thermally aged state in the engine control system.

20. The apparatus as claimed in claim 9, wherein the temperature-control device configured to selectively heat and cool the precatalyst, to achieve the target $NO_2/NO_x$ ratio, includes a secondary air pump that is configured to at least cool the precatalyst.

21. An apparatus for decreasing an amount of nitrogen oxides present in a lean exhaust gas from an internal combustion engine comprising:
a reduction catalyst;
a precatalyst which is located upstream of the reduction catalyst, the precatalyst having at least one oxidation-active catalytic component;
a particle filter located downstream of the precatalyst which is configured either: as a separate component arranged upstream from the reduction catalyst; or as a support body of the reduction catalyst carrying an SCR-active catalytic coating;
a metering facility for ammonia or a compound which is capable of decomposing into ammonia, the metering facility being connected to a reducing agent source independent of an exhaust gas stream, the metering facility being arranged between the precatalyst and the reduction catalyst; and
a temperature-control device configured to selectively heat and cool the precatalyst independently of an operating state of the engine such that the exhaust gas has a first $NO_2/NO_x$ ratio prior to entering the particle filter, the first $NO_2/NO_x$ ratio being a ratio that compensates for a reaction between the exhaust gas and a soot loading of the particle filter such that the exhaust gas has a target $NO_2/NO_x$ ratio of from 0.3 to 0.7 upon interacting with an SCR-active catalytic coating of the reduction catalyst, wherein
the temperature-control device is further configured to selectively heat the precatalyst by way of a heat transfer path that is separate from any heat transfer path provided by the exhaust gas stream.

22. A process for decreasing an amount of nitrogen oxides present in a lean exhaust gas from an internal combustion engine, comprising:
passing an exhaust gas over the at least one oxidation-active catalytic component of the precatalyst and the reduction catalyst of the apparatus according to claim 21.

* * * * *